(12) United States Patent
Marmalyevskyy et al.

(10) Patent No.: US 7,110,323 B2
(45) Date of Patent: Sep. 19, 2006

(54) METHOD, SYSTEM AND APPARATUS FOR INTERPRETING SEISMIC DATA USING DUPLEX WAVES

(76) Inventors: Naum Marmalyevskyy, 36 Obolonsky Av., Apt. 31, Kiev, 04214 (UA); Zynoviy V. Gornyak, 1 Majorova Str., Apt. 60, Kiev, 04201 (UA); Alexander S. Kostyukevych, 2905, 123-10th Ave. S.W., Calgary, Alberta (CA) T2R 1K8; Viktor V. Mershchiy, 4 Grinchenko B. Str., Apt. 12, Kiev, 01001 (UA); Yuriy V. Roganov, 47 Demievska Str., Apt. 111, Kiev, 03040 (UA)

( * ) Notice: Subject to any disclaimer, the term of this patent is extended or adjusted under 35 U.S.C. 154(b) by 0 days.

(21) Appl. No.: 10/920,753

(22) Filed: Aug. 18, 2004

(65) Prior Publication Data
US 2005/0232077 A1    Oct. 20, 2005

Related U.S. Application Data

(60) Provisional application No. 60/495,879, filed on Aug. 19, 2003.

(51) Int. Cl.
*G01V 1/28* (2006.01)
*G01V 1/30* (2006.01)

(52) U.S. Cl. .............. 367/37; 367/38; 367/47; 367/53; 367/73; 702/10

(58) Field of Classification Search .......... 367/37, 367/38, 47, 53, 73; 702/10
See application file for complete search history.

(56) References Cited

U.S. PATENT DOCUMENTS 2,449,921 A * 9/1948 Wolf ............... 367/56
4,849,887 A * 7/1989 Skylas ............ 702/18

(Continued)

FOREIGN PATENT DOCUMENTS

GB      2382651       6/2003

OTHER PUBLICATIONS

Uzhakin. Method of Detecting Duplex (Twice-reflected) Waves on CDP (Common Depth Point) Seismograms. (abstract only) Petroleum abstracts. No. 349329, Jul. 1982.*

(Continued)

*Primary Examiner*—Jack Keith
*Assistant Examiner*—Scott A. Hughes

(57) ABSTRACT

A Method for Interpreting Seismic Data Using Duplex Waves is described. Whereas substantially horizontal boundaries are readily identified using conventional processing methods based on primary reflections, it has been difficult or impossible to use such methods for locating substantially vertical events or boundaries. The method of the present invention uses secondary reflections to locate substantially vertical events by gathering common source or receiver traces for processing. Wave fields of these gathers are continued downward to the level of the base boundary, then at each discrete depth level, a seismic image of sub-vertical events is formed. The downward-continued gathers correspond to the travel time of the wave from when it left the source or the receiver point, was reflected from the base boundary, and arrived to the corresponding point of the discrete level of wave-field continuation. In order to increase the noise tolerance of the resulting image of the target sub-vertical event-seismic images, obtained from the common source and receiver gathers, may also be summed together or stacked.

5 Claims, 10 Drawing Sheets

U.S. PATENT DOCUMENTS

| | | | | |
|---|---|---|---|---|
| 4,987,561 A * | 1/1991 | Bell | ............................ | 367/53 |
| 5,012,453 A | 4/1991 | Katz | ............................ | 367/57 |
| 5,189,643 A * | 2/1993 | Wang et al. | .................. | 367/38 |
| 5,307,268 A * | 4/1994 | Wang et al. | .................. | 702/16 |
| 6,317,384 B1 * | 11/2001 | Luo et al. | ..................... | 367/47 |
| 6,546,339 B1 * | 4/2003 | Bevc et al. | .................... | 702/18 |
| 2003/0225523 A1 * | 12/2003 | Kozyrev et al. | .............. | 702/14 |
| 4,849,945 A | 7/1989 | Widrow | ....................... | 367/30 |
| 4,926,393 A * | 5/1990 | McClellan et al. | ........... | 367/57 |
| 4,953,142 A * | 8/1990 | Rimmer | ...................... | 367/73 |

OTHER PUBLICATIONS

Gurvich. "Kinematic Features of Twice Reflected Seismic Waves." (abstract only) Petroleum Abstracts No. 282183, Nov. 1978.*

Lutsenko. "New method for interpreting seismic waves in stratified media." (abstract only) Smithsonian/NASA ADS Physics/Geophysics Abstract Service. 1985.*

Cavalca, et al. "Towards the tomographic inversion of prismatic reflections." KIM 2001 Annual Report.*

International Search Report dated Nov. 26, 2004.

* cited by examiner

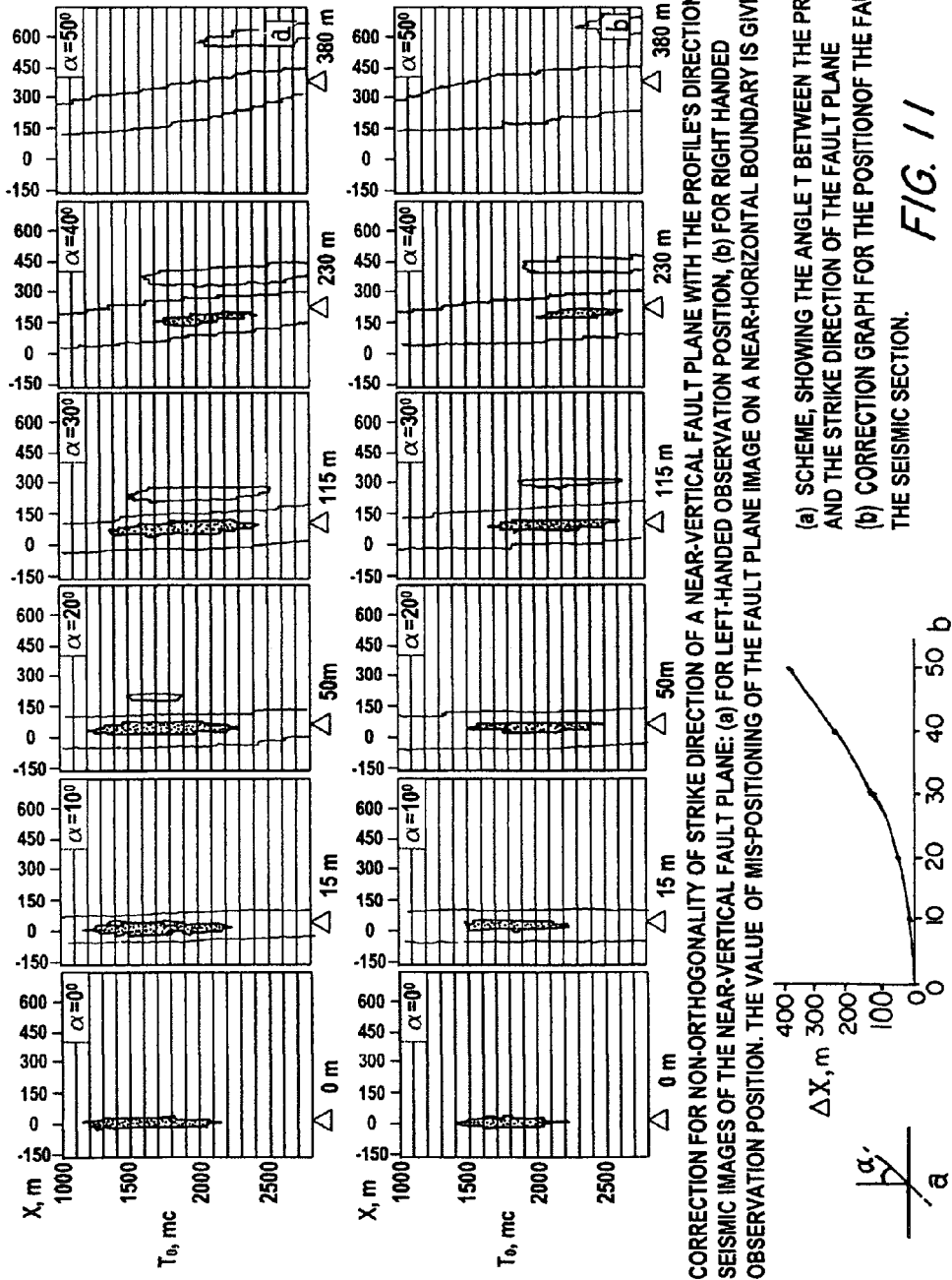

FIG. 11

CORRECTION FOR NON-ORTHOGONALITY OF STRIKE DIRECTION OF A NEAR-VERTICAL FAULT PLANE WITH THE PROFILE'S DIRECTION. SEISMIC IMAGES OF THE NEAR-VERTICAL FAULT PLANE: (a) FOR LEFT-HANDED OBSERVATION POSITION, (b) FOR RIGHT HANDED OBSERVATION POSITION. THE VALUE OF MIS-POSITIONING OF THE FAULT PLANE IMAGE ON A NEAR-HORIZONTAL BOUNDARY IS GIVEN.

(a) SCHEME, SHOWING THE ANGLE T BETWEEN THE PROFILE AND THE STRIKE DIRECTION OF THE FAULT PLANE
(b) CORRECTION GRAPH FOR THE POSITION OF THE FAULT ON THE SEISMIC SECTION.

METHOD, SYSTEM AND APPARATUS FOR INTERPRETING SEISMIC DATA USING DUPLEX WAVES

RELATED APPLICATIONS

The present application claims priority from U.S. provisional Ser. No. 60/495,879 filed 19 Aug. 2003.

FIELD OF THE INVENTION

The present invention relates generally to processing seismic data and particularly to imaging steeply dipping geologic boundaries.

BACKGROUND OF THE INVENTION

Conventional seismic data processing methods are based on detecting primary reflections using a line (2D) or a grid (3D) of receivers placed on or near the surface of a geologic zone of interest. The position of each receiver is known relative to a source of seismic energy, which when triggered creates acoustic mechanical waves, which in turn activate electro-mechanical transducers that are an element of each receiver. Each mechanical wave can activate one or more transducers while outbound from its source, then again upon a first reflection from a subsurface interface or boundary (sometimes called an "event"), and then again upon one or more secondary or tertiary reflections. Electro-magnetic signals generated by the transducers are recorded or "gathered" (i.e. creating a seismogram to represent the primary reflected waves), then position corrected or "migrated", and later "stacked" with sibling signals recorded by the same receiver during subsequent activations of the same source in order to reduce the influence of transient noise. Using any of a number of available algorithms that accept as data such signals resulting from primary reflections, gathers are processed to generate images that reveal substantially horizontal boundaries or interfaces at different depths, which images represent events or layers against which the mechanical waves were at different times reflected and through which those waves travel at different velocities that depend in part on the properties of the surface of those events and the composition of those layers.

It is understood that information respecting primary reflections arriving at different receivers at different times from sub-horizontal events can be coordinated and interpreted to accurately identify subsurface reflectors that are instead oriented somewhat vertically (known as sub-verticals) to within a limited range of angles (normally less than 60 degrees). For these mildly vertical reflectors such extrapolation from primary reflections has been developed to filter out complex double reflections and ignore their influence on resulting images as noise. However, for more steeply vertical reflectors such techniques extrapolating from primary reflections are insufficient to generate unambiguous images so as to reveal the existence, position, and orientation of such events to an acceptable level of certainty.

Where a vertically oriented reflector is sufficiently large or otherwise distinct (e.g. well known faults that are used as reference reflectors for testing and calibrating systems), conventional technologies can gather signals strong enough for experienced users to successfully extrapolate the required vertical information from horizontal information. However, when the steeply dipping reflector is a more subtle fault, even the most skilled users are exposed to a margin of error that is unacceptably large for the purpose of deciding where to spend millions of dollars drilling into a formation, which requires a high level of confidence that the deduced image is both genuine and located where calculated.

One example of such conventional seismic data processing methods is described in Ukraine Patent #42312, G01V1/100, G01V1/40, publ. 15 Oct. 2001 Bulletin #9, issued to Maramlevsky et al. ("312") respecting a seismic reflection method for studying steeply dipping (i.e. sub-vertical) reflectors, whereby a linear group of sources is placed orthogonally to the plane of the exploration target, and the receivers are located both on the surface and in a borehole. The data is processed by multi-channel filtration to enhance primary waves that are reflected and dispersed from sub-vertical dipping and curvilinear boundaries. The seismic images of boundaries are generated based on the concurrent analysis of both the surface and the subsurface data, which determines spatial positioning and tests the validity of the constructed images. Disadvantageously, the method of 312 requires recordings from deep in a borehole, reducing its practical application, and processes only primary reflections.

Another example of conventional seismic data processing method is described in USSR Patent #894633, M. Kl. G01V1/100, publ. 30 Dec. 81 Bulletin #48, issued to Shalishov et al ("633") respecting a seismic reflection method for steeply dipping reflectors, which is based on generation and recording of reflected waves along a linear profile of several sources that are located on the dip side of the steeply dipping surface. The interval between source and receiver points is selected to be no smaller than double the distance between the source point and the projection of the edge of the target surface onto the line of the source profile. Waves are recorded from the common point of double reflection—i.e. "duplex" waves, meaning those waves (commonly referred to as "formed under conditions of a spatial corner") that have undergone double reflection—the first or primary reflection from the steeply dipping target surface and, the secondary reflection from any flat surface. The method of 633 assumes the recording of waves from points of common double reflection with certain delays, which assures in-phase summing, minimal distortion, and the maximum suppression of noise. Disadvantageously, the method of 633 requires special positioning of receivers and sources in relation to the dipping surface of the sub-vertical target, which leads to ambiguity unless there is prior data about the dip direction of the event. Further, the method of 633 provides an increased signal-to-noise ratio only for the duplex wave, without providing for a method of forming an image of the sub-vertical events ("SVE").

The development of migration procedures in recent years has permitted increased accuracy in mapping areas having complex geology, including areas having salt domes. However, precise delineation of salt stocks, tracing of faults, and other problems connected with near-salt sediments, often still result in ambiguous solutions because sub-vertical reflecting boundaries have rugose surfaces. Waves reflected only once from such boundaries, tend not to reach the surface (at least within the observation geometry) and have been studied using "vertical seismic profiles" (VSP) according to which seismic images are created using a special migration transformation. However, the practical efficiency of such an approach is limited, because in the boreholes such reflections can only be recorded at depth intervals deeper than the target boundary. However, some waves can be reflected by sub-vertical faces of salt stocks and subsequently by sub-horizontal boundaries in adjacent sediments, permitting them to be recorded on the surface if they have enough energy to be identified against the background of other reflections. In Russia such waves are known as "duplex", having undergone two reflections during propagation. Duplex waves can be formed not only under conditions of salt dome tectonics, but also at small-displacement faults, when the acoustic properties of the fault contrast significantly with those of the host rock. This commonly happens when the fault is a tectonic element of a hydrocarbon trap and, therefore, the epigenetic alterations associated with the deposit result in a significant acoustic contrast across the dislocation zone. Consequently, while it is difficult to use phase-shift analysis (due to the low resolving power of conventional seismic processing methods) duplex waves can be used to identify and trace faults with small displacements.

Typically, after "shooting" a new set of raw data— substantial work will be done to create the basic seismic data used for conventional processing of information relating to primary reflections. For example, if the soil within the observation surface (3D) or observation profile (2D) is uneven or composed of compressible material such as topsoil, then the raw data will typically be normalized or static corrections made, or filtered to remove the effects of surface waves. Such work as is used for pre-stack migration results in an output data set that is easier to use in future processing.

All such conventional processing requires a velocity model to define the propagation velocity of acoustic energy through the subject geologic medium (whether for a 3D cube or a 2D cross-section) at different depths. Sometimes the velocity model used is derived from actual well logs that directly identify what kind of medium is present at each of those different depths. Knowing or assuming a propagation velocity of acoustic energy through the subject geologic medium permits users to calculate the position over time of each point on a wave-front, which in turn permits the extrapolation of information regarding the position of any event from which that wave-front is believed to have been reflected. If the velocity model is not accurate, then position information respecting the base boundaries will be different when calculated based on primary reflections originating from different sources, which will cause the base boundary to "move" as the assumptions built-in to the velocity model are adjusted. These position errors can be used to allow an experienced user to instinctively adjust either the position or the model, to reduce the error as between different sets of assumptions. However, disadvantageously, for conventional processing of planes or cubes including sub-horizontal reflectors—only one side of each horizontal reflector is accessible from which to calculate its position such that errors in the velocity model result in errors in the position of the generated image of such horizontal reflectors, relative to their true position. It is therefore desirable to have means and a method to improve both a velocity model and the calculated position of the image of a reflector.

The prior art in the seismic data processing industry has concentrated on teaching variations of and refinements on the use of primary reflected energy, often treating multiple reflections as noise. However, even where duplex waves resulting from secondary or subsequent reflections is taken into account, the prior art relies on special configurations of the detection system. Accordingly it is desirable to have a method that uses information previously considered to be noise, and requires no special setup such that pre-existing recorded data may be reprocessed to obtain new information.

Conventional seismic acquisition and processing use primary reflected waves propagating from the surface source, then reflecting from some sub-surface event (e.g. an individual reflector, a boundary, or an interface between layers of different compositions), and then traveling back to the surface where they are observed. Disadvantageously, primary reflections from steeply dipping boundaries may reach the observation surface far outside the observation geometry or not reach it at all. Events that may be imaged using mainly primary reflections are commonly referred to as sub-horizontal boundaries, whereas steeply dipping or inclined boundaries that are difficult to identify using only primary reflections are referred to as sub-vertical boundaries or sub-vertical events ("SVE"). Waves returning to the surface from major sub-horizontal or "base" boundaries may be both reflected and refracted, which can be of practical significance since high-velocity layers (e.g. limestone) are commonly the strongest reflection boundaries on which pronounced refracted waves may be formed.

By way of definition, migration is an inversion operation during which seismic data elements are rearranged in order to plot images of reflectors at their true location, but includes the data processing and corrective adjustments necessary for the 2-D case to generate an image including the position of corrected faults. Modeling is the generation of a seismic environment based on artificial data. Imaging is used in the wider sense to include the data processing required to create an "image". Vizualization is used in the narrow sense of creating output for viewing on a screen or printout. And, Geometric place of the points ("GPP") means the position of points relating to a geometric construct. For example, a sphere is a GPP having the same distance from its center to each point on its surface. Each receiver in an observation geometry records (the amplitude of) seismic signals from a source as a function of time (t). The beginning of signal generation by a source corresponds to t=0. Seismic signals recorded by one receiver are known as a "trace" (amplitude as function of time). Traces normally are combined in a "gather". Traces may be combined in different ways, for example, traces relating to one source represent Common Source Gather ("CSG"), whereas traces relating to one receiver recording from different sources are known as a Common Receiver Gather ("CRG").

SUMMARY OF THE INVENTION

In order to overcome the disadvantages of the prior art a method and system are described, which use information based on secondary reflections (previously considered to be noise) and which method and system require no special setup such that even pre-existing recorded seismic data may be reprocessed to obtain new information. Using the invention results in output suitable for modeling seismic images (migrated seismic sections) of steeply dipping and reflective geologic boundaries (e.g. steep sides of salt intrusions, small-displacement faults, block boundaries) the steep dip angle (commonly between 60 and 90 degrees from the horizontal) of which prevents satisfactory imaging using conventional seismic methods. The pre-stack migration of duplex waves using the present invention is a novel method and system for identifying and tracing sub-vertical events of various kinds, which method and system apply to both synthetic and field data for mapping salt dome flanks and faults with small displacements. Advantageously, viewing archive data for reprocessing involves no assessment of the quantity of secondary reflections present in the data set. Neither is any particular or new grid configuration required. Although various observation system parameters may be adjusted where the presence of sub-vertical events is suspected to be crucial, no special seismic observation system is needed in order to benefit from the duplex wave migration ("DWM") processing of the present invention. DWM allows images to be obtained of the vertical events creating secondarily reflected waves. Using a given set of basic seismic data (created from normalizing or otherwise cleaning up raw data), according to the method aspect of the present invention such basic seismic data set is loaded, including information respecting the relative positions of the source(s) and receivers, together with the positions of the main structural horizons that were the target of the primary reflections recorded using conventional observation systems. Those main structural horizons are the "base boundaries" from which to perform (on the same data set) migration processing on duplex waves, and two types of duplex waves are used to construct images of sub-vertical events.

Advantageously, the method of the present invention based on duplex waves also permits access to both sides of sub-vertical reflectors allowing users to reconcile position calculations from each side of the same sub-vertical reflector based on a single velocity model. If the model is incorrect, then the calculated position of a given sub-vertical reflector may differ based on sources and receivers using energy reflected from opposite sides. Reconciling the positions calculated from each side may occur when the velocity model is incrementally adjusted. As the positions calculated from each side draw closer together (potentially matching for a thin reflector) the velocity model improves to more closely match the sub-surface reality. The improved velocity model is then used to recalculate the position of the "base boundaries" under conventional seismic processing before that information is used in the method and system of the present invention for processing information respecting duplex waves.

Advantageously, the method of the present invention does not require any identification of secondary reflections in the data set before applying the inventive migration method. An initial velocity model (i.e. assumptions regarding soil composition) is used to perform migration and obtain position information, variations in which are then used to correct the velocity model and rerun the migration iteratively arriving at images that are consistent between different source/receiver combinations. Using DWM filters or attenuates the effect of all waves that are not based on secondary reflections. Signals from non-duplex waves are stacked out-of-phase such that they are suppressed (in the output) rather than accumulated. Advantageously, a clearer image results in which sub-vertical events can be seen without interference from images relating to horizontal events. The practical limitations of the size of an observation surface are such that primary reflections from sub-vertical events inclined more than 60 degrees do not reach the surface to be recordable within the boundaries of that observation surface. To implement such stacking out-of-phase a person of skill using the DWM method may take advantage of any suitable mathematical technique for continuing a wave field. Duplex waves of two types are captured (when making conventional 2D and 3D seismic observations) as part of each recording. Type I duplex waves are first reflected from a sub-vertical event along the propagation path of the subject wave and then from a sub-horizontal base boundary, before being recorded on an observation surface or line. Type II duplex waves are instead first reflected from a sub-horizontal base boundary and then from a sub-vertical event. Special observation configurations (such as those of 633) are not required because the hodographs of the Types I and II duplex waves (based on secondary reflections) are different than those for primary reflections, but are complementary to each other such that they may be summed either before or after stacking, which reduces the effects of any noise. It is this characteristic of the Types I and II duplex waves that permits the required information to be extracted from data sets gathered using conventional observation systems—without the need of prior information respecting the location and dip extent of steeply dipping sub-verticals. However, if recordings taken from deep inside a borehole (e.g. the VSP method) are also available, the duplex waves captured in those recordings may also be used to form seismic images of such sub-verticals.

Once duplex wave data is ready for use in the wave-equation, migration is performed to correct any mis-positioning present in the results. Since each of the Types I and II duplex waves is by definition generated by reflection (whether first or second) from a single sub-horizontal base boundary (in order to be meaningful and consistent), the imaging results are appropriately associated with that sub-horizontal base boundary. Migration, which makes this association of each duplex wave with a particular point on a particular sub-horizontal base boundary, is an element of the present invention, typically carried out by applying the wave-equation in the time domain by a finite difference method. Pre-stack depth migration is preferred for accuracy because it allows for the variation of wave velocity both vertically and horizontally. Seismic data (typically recorded as a function of arrival time) is thereby transformed into a scaled version of the geometry of the subsurface geologic features that produced it—permitting skilled users to locate events correctly and sharpen event terminations. Once the duplex waves have been migrated they may be stacked to reduce the influence of noise on the resulting images generated from the sub-verticals, the visualization of which may be performed using a number of modeling technologies. All presently known methods for migrating duplex waves require the position of at least one base boundary as part of the information input to form images of the sub-vertical events. According to the method aspect of the present invention, for the unification of the migration process, the migration of Type I waves is carried out using gathers common to each receiver, while the migration of Type II waves is completed using gathers common to each source.

To overcome the disadvantages [e.g. using larger offsets is expensive and the resulting secondary waves are weak] of full wave vector depth migration (theoretically useful to image sub-vertical events) for which the algorithms are also not currently sufficient—advantageously—DWM focuses on vertical events (suppressing information about horizontal events), thereby reducing the total number of bytes of data that must be handled, to make processing very efficient, such that even if one uses a supercomputer to perform full wave vector depth migration, DWM still executes faster even with less computer processor capacity.

Advantageously, DWM permits the identification of even very weak sub-vertical events, such as an interface between gas & water or oil & water reservoirs, the location of which interfaces is useful to determine the boundaries of the gas and oil reserves in a geologic area of interest.

Advantageously, DWM allows summing either or both of Type I and Type II waves, however summing both Types together is preferred because it results in a higher signal/noise ratio.

According to one aspect of the present invention, there is provided a method for processing seismic data using a structural horizon at a known depth $Z_n$, a velocity model, and non-primary reflections, where for time T the relations $T_0 > T_1 > T_i$, and $Z_0 < Z_1 < Zi < Zn$ are observed, for the purpose of locating substantially vertical events, the method comprising the steps: form common receiver point gathers ("CRPG") using said seismic data so as to create a CRPG wave-field; continue said CRPG wave-field, for each CRPG and for each discrete level $Z_i$ down to Zn, using said velocity model to determine each amplitude $F_i(X_i, Y_i, Zi, T_i)$; calculate each CRPG wave-field travel time $T_i$ for each discrete level $Z_i$; and sum said amplitude $F_i(X_i, Y_i, Zi, T_i)$ corresponding to each said travel time $T_i$ for each CRPG wave-field.

According to one aspect of the present invention, there is further provided a method for processing seismic data using a structural horizon at a known depth Zn, a velocity model, and non-primary reflections, where for time T the relations $T_0 > T_1 > T_i$, and $Z_0 < Z_1 < Zi < Zn$ are observed, for the purpose of locating substantially vertical events, the method comprising the steps: form common source point gathers ("CSPG") using said seismic data so as to create a CSPG wave-field; continue said CSPG wave-field, for each CSPG and for each discrete level $Z_i$ down to Zn, using said velocity model to determine each amplitude $F_i(X_i, Y_i, Zi, T_i)$; calculate each CSPG wave-field travel time $T_i$ for each discrete level $Z_i$; and sum said amplitude $F_i(X_i, Y_i, Zi, T_i)$ corresponding to each said travel time $T_i$ for each CSPG wave-field.

According to one aspect of the present invention, there is further provided a method for processing seismic data recorded with at least one source and receiver, using at least one structural horizon at a known depth, a velocity model, and a plurality of non-primary reflections including Type I and Type II duplex waves, where the relation $T_0 > T_1 > T_i$, $Z_0 < Z_1 < Zi < Zn$ is observed, for the purpose of imaging steeply dipping vertical events, the method comprising the steps: form a plurality of common receiver point gathers ("CRPG") using said seismic data so as to create a CRPG wave-field; continue said CRPG wave-field of Type I duplex waves, for each said CRPG and for each discrete level $Z_i$ down to each said structural horizon, using said velocity model to determine each amplitude $F_i(X_i, Y_i, Zi, T_i)$; calculate each Type I duplex wave travel time $T_i$ for each discrete level $Z_i$; and form a seismic image using said amplitude $F_i(X_i, Y_i, Zi, T_i)$ corresponding to each said travel time $T_i$ for Type I duplex waves; then form a plurality of common source point gathers ("CSPG") using said seismic data so as to create a CSPG wave-field; continue said CSPG wave-field of Type II duplex waves, for each said CSPG and for each discrete level $Z_i$ down to each said structural horizon, using said velocity model to determine each amplitude $F_i(X_i, Y_i, Zi, T_i)$; calculate each Type II duplex wave travel time $T_i$ for each discrete level $Z_i$; and form a seismic image using said amplitude $F_i(X_i, Y_i, Zi, T_i)$ corresponding to each said travel time $T_i$ for Type II duplex waves; then sum said seismic image using Type I duplex waves with said seismic image using Type II duplex waves, to form a seismic image of a target event.

The accompanying drawings, which are incorporated in and constitute a part of this specification, illustrate preferred embodiments of the method and system according to the invention and, together with the description, serve to explain the principles of the invention.

BRIEF DESCRIPTION OF THE DRAWINGS

The present invention, in order to be easily understood and practised, is set out in the following non-limiting examples shown in the accompanying drawings, in which:

FIG. 11 is a series of 12 screen shots showing the change in position shift between a true and imaged position of a sub-vertical reflector at various angles of non-orthogonality.

DETAILED DESCRIPTION OF THE PREFERRED EMBODIMENT

Reference is to be had to FIGS. 1–11 in which identical reference numbers identify similar elements.

According to the invention, in one of its broad embodiments, there is provided a novel method for using non-primary reflections to accurately identify and characterize steeply dipping sub-vertical events. According to a preferred embodiment of the method of the invention, secondary reflections or duplex waves are migrated while the effects of primary reflections are suppressed. Duplex wave migration uses two types of duplex waves that differ by their direction of propagation. Waves of the first type reflect first from a sub-vertical and then from a sub-horizontal boundary. The second wave type reflects from a sub-horizontal and then a sub-vertical event, before reaching the surface. In duplex wave migration, the main energy contribution is made by waves with large angles of incidence.

Figure 1:
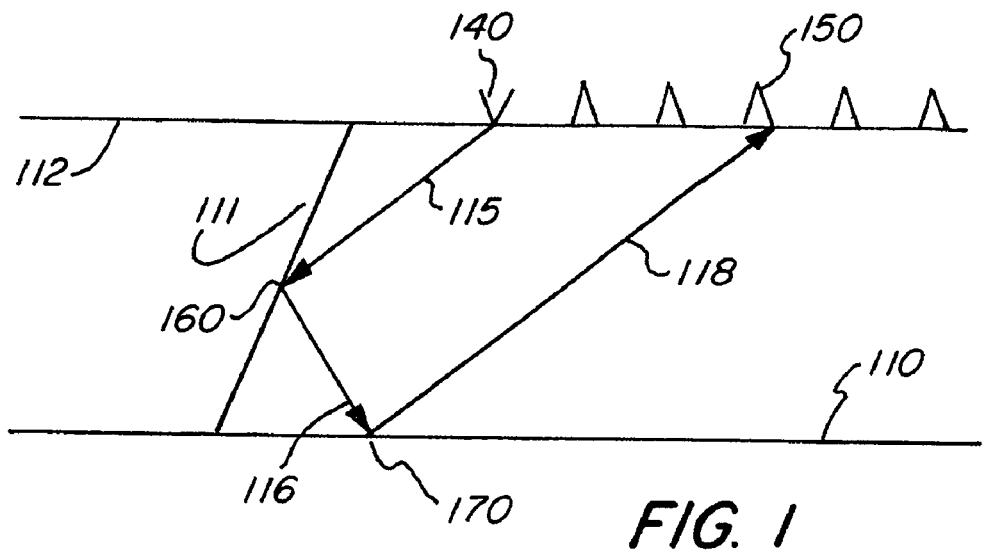
FIG. 1 is a ray path drawing illustrating a Type I duplex wave.

Referring to FIG. 1, a side view of the ray path of a Type I duplex wave is shown in which minor fault event 111 is shown steeply dipping between observation surface 112 and sub-horizontal base boundary 110. A plurality of receivers 150 are shown configured in a (2D) line adjacent source 140 that is triggered to create an acoustic disturbance that propagates as a downward travelling wave-front (not shown) following ray path 115 to strike event 111 at point 160 where it reflects downward as a primary reflection following ray path 116 until it strikes base boundary 110 at point 170, thereby creating a secondary reflection in the form of an upward travelling Type I duplex wave (not shown) following ray path 118 until it returns to observation surface 112 where it is recorded using at least one receiver 150 on said line. The depth and shallow angle of incline of base boundary 110 are known from earlier conventional processing work done to identify sub-horizontal events.

Figure 2:
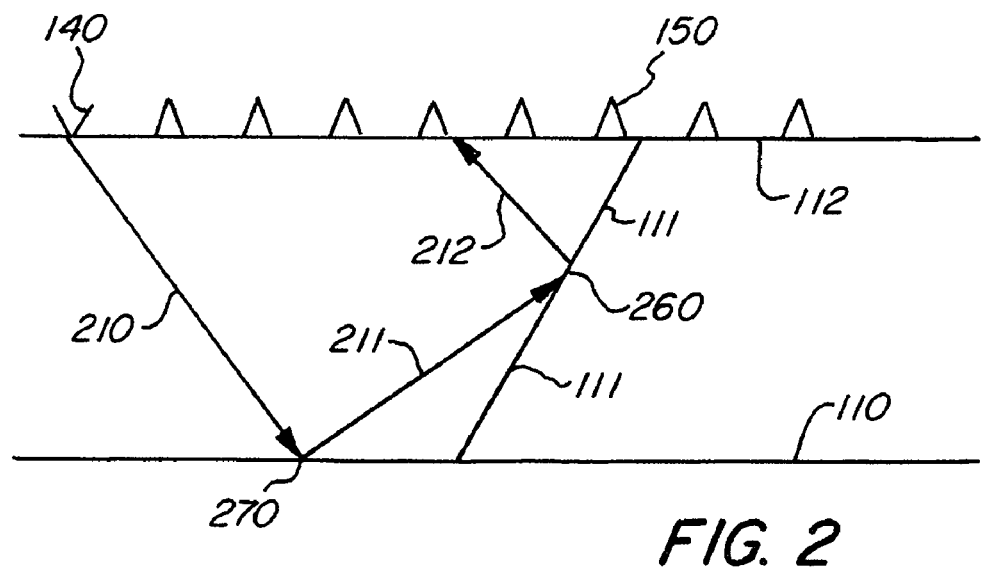
FIG. 2 is a ray path drawing illustrating a Type II duplex wave.

Similarly, referring to FIG. 2, a side view of the ray path of a Type II duplex wave is shown in which minor fault event 111 steeply dips between observation surface 112 and sub-horizontal base boundary 110. Here an acoustic disturbance propagates as a downward travelling wave-front (not shown) following ray path 210 to strike base boundary 110 at point 270 where it reflects upward as a primary reflected wave-front (not shown) following ray path 211 until it strikes event 111 at point 260, thereby creating a secondary reflection in the form of an upward travelling Type II duplex wave (not shown) following ray path 212 until it returns to observation surface 112 where it is recorded by at least one receiver 150 on said line. When an observation line records from both "sides" of steeply dipping event 111, receivers 150 on opposite sides of event 111 can receive opposite wave Types.

Referring to FIGS. 3, 5, 6 and 8, the method of the present invention is illustrated commencing with the input of at least one 2D or 3D data set that includes sufficient "duplex" content to make it commercially suitable for processing according to the method of the present invention. Although the method of the present invention may be used to process all known forms of seismic data, a person of skill in the art would understand that for a variety of reasons, including the cost of the computing system time required, it is useful to assess pre-existing data respecting its secondary reflection content. According to an alternate embodiment, seismic data recorded specifically for duplex processing may be organized in a manner that (without additional expense or equipment) increases the likelihood of capturing stronger duplex wave data. Once the subject data set has been either selected or recorded, at step 300 it is input to the system (not shown) of the present invention for processing. If primary reflections have not already been processed, at step 310 the locations of sub-horizontal events (e.g. sub-horizontal base boundary 110) are determined. At step 320 the location of at least one major sub-horizontal event (also known as a structural horizon) is used in calculations that require the distance between sub-horizontal base boundary 110 and observation surface 112.

Next, either in series or, according to a preferred embodiment, in parallel, Common Receiver Point ("CRP") and Common Source Point ("CSP") gathers are formed at steps 331 and 332 respectively.

At step 333, for each CRP gather execute a Continuation of the wave-field associated with Type I duplex waves, for each discrete level, to each base boundary, using a depth migration velocity model. And, at step 334, for each CSP gather execute a Continuation of the wave-field associated with Type II duplex waves, for each discrete level, to each base boundary, using the same depth migration velocity model. Then, use the continued wave-fields resulting from said Continuation operations to the determine travel time as follows.

At step 335, for each CRP gather, for each discrete level, calculate each travel time ($T_0$) of the wave reflected from each base boundary to each point M. And, at step 336, for each CSP gather, for each discrete level, calculate each travel time ($T_0$) of the wave reflected from each base boundary to each point M. Then, use each resulting travel time ($T_0$) with the value of each continued wave-field corresponding to each said travel time ($T_0$) as follows.

At step 337, for each CRP gather, for each discrete level, form a seismic image using the value of the continued wave-field corresponding to each travel time ($T_0$). And, at step 338, for each CSP gather, for each discrete level, form a seismic image using the value of the continued wave-field corresponding to each travel time ($T_0$).

According to a preferred embodiment of the method of the present invention, a depth migration velocity model is used (at steps 333 and 334) in the above processing to permit variations in both the horizontal and vertical velocity of an acoustic signal to be taken into account. And, migration, for each duplex wave Type is carried out using more than one base boundary to permit correlation of the resulting images of particular sub-vertical events. Once both Types of duplex waves have been so processed, the data resulting from steps 337 and 338 is summed (and may also be stacked) at step 390 to produce output suitable for use as input to any of several known software applications for such image generation and visualization.

The above migration of duplex waves (although it can be realized using other kinds of transformation including: ray tracing, finite difference, spectral, etc.) is commonly based on the Kirchoff transformation (i.e. integrating along diffraction curves using an integral form of the wave equation and then placing the results at the crests of the diffraction curves) in which the Green function (i.e. using an impulse as the exciting force, and taking the convolution of the source wavelet and the Green function for the subject medium) may be repeatedly recalculated along the subject fault according to the kinematics of the subject duplex waves in the medium expected to be present at the subject discrete level, while the velocity model is used is that used for conventional migration procedures. The sub-horizontal base boundary referred to above is selected and specified from among those that describe the 3D macro model of the section of interest. Generally when tracing the sub-vertical events within the target depth range, several sub-horizontal boundaries are chosen and interpreted together. The 2D migration of duplex waves improves when the position of each fault is corrected periodically depending on the direction of its strike relative to the direction of the line of the observation profile, which correction is calculated on the basis of the 3D modeling of duplex waves with their subsequent 2D migration as appropriate. Experience in the application of 2D migration of duplex waves shows that the size of this correction depends mainly on the angle between the observation line and the strike of the fault, rather than on the characteristics of the medium or the depth of the base boundaries. Advantageously, the duplex wave migration procedure of the present invention is also a convenient tool for the determination of correct migration velocities. In the case of a fault, for which a source can be placed on both sides of the target event (i.e. a split spread), an image formed when a target is located to the right of a source will coincide with an image formed of the same target having a source to the left—only at the true migration velocity (a focusing phenomenon). If the velocity used is not correct, then the images resulting will be separated in space. The bigger the difference in the image positions, the greater the velocity error. Consequently, a velocity analysis based on duplex wave migration is executed most confidently in the presence of a split spread.

Figure 4:
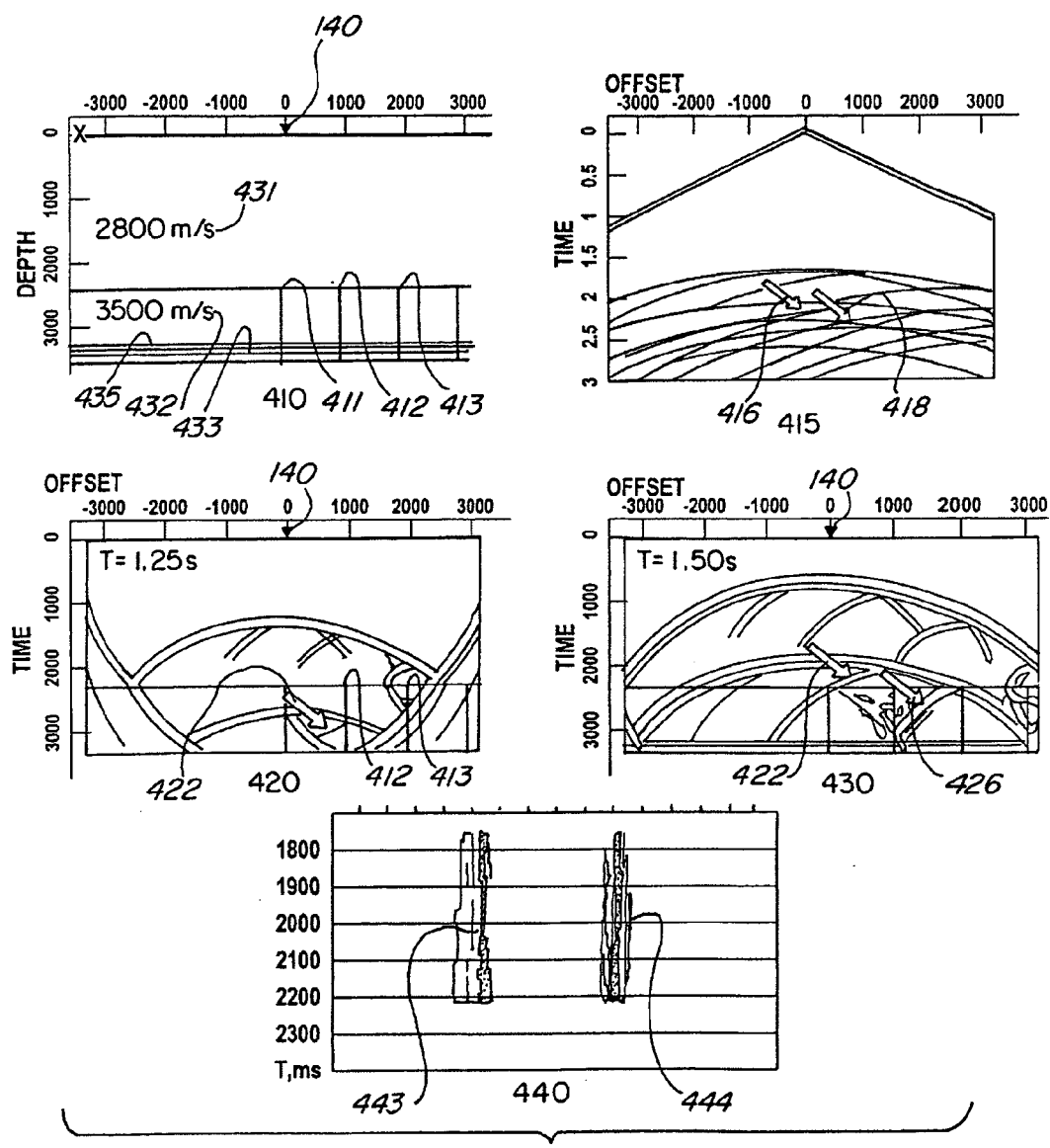
FIG. 4 is a series of five screen shots from computer software that implements the method of the present invention, showing reflections from vertical reflectors.

Referring to FIG. 4, there is illustrated (using a composite figure) an example of the results of imaging sub-vertical events based on synthetic data and full-wave modeling, which figure includes:

Screen shot 410—illustrates a geological model (having layers that have different propagation velocities), where 411, 412, and 413 are vertical events below a surface at X, and 140 is a source, and where 435 is a horizontal base boundary and 431, 432, 433 are physical layers having propagation velocities of 2800 m/s, 3500 m/s and 4200 m/s respectively;

Screen shot 415—illustrates a Common Source Gather as observed at the surface on a time scale, where arrows 416 and 418 point to duplex waves;

Screen shot 420—illustrates an instantaneous slice (at t=1.25 s after shot 140 was triggered) of a wave-field propagating through the medium of Screen shot 410, where arrow 422 points to a duplex wave reflected from vertical event 412 while another portion of said wave-field is still downward bound to vertical event 413;

Screen shot 430—illustrates an instantaneous slice (at t=1.50 s after shot 140 was triggered) of the wave-field of Screen shot 420, where arrow 422 points to the duplex wave reflected from vertical event 412, but at a time 0.25 s later than shown in Screen shot 420—and arrow 426 points to a new duplex wave reflected from vertical event 413; and Screen shot 440—illustrates seismic images 443 and 444 of vertical events 412 and 413 respectively.

The model illustrated in FIG. 4 was based on a grid layout having one source (at X=0 m) and a symmetric spread ranging +/−3200 m with a receiver interval of 20 m. When vertical events 411, 412, and 413 are orthogonal to base boundary 435, duplex waves of Type I and II represent continuations of one another and are kinematically indistinguishable. During computation of the Common Source Gather of Screen Shot 415, instantaneous states of the propagating wave-field shown in Screen Shots 420 and 430 were computed and used to predict the appearance of duplex waves, and to refine the observation layout. Screen Shots 420 and 430 demonstrate that duplex waves are easy to see even against a complex background. In Screen Shot 415 duplex waves are observed against a noisy background but, due to their kinematic properties, can be identified with a high level of confidence. All migration procedures use information about a base boundary and the spatial distribution of the velocity of mechanical waves at each point in the geologic volume being studied. Duplex Wave Migration can use the same velocity model as that used for conventional depth migration. Advantageously, duplex wave migration allows images to be obtained by migrating a single seismogram (e.g. Screen shot 415) without the stacking applied in a conventional multifold survey.

According to one embodiment of the method of the present invention, to image sub-vertical events within the target depth range, several base boundaries are interpreted together. With 3D duplex wave migration the dipping of sub-vertical events has no practical significance. However, with 2D duplex wave migration, the dipping of sub-vertical events causes distortion that requires correction. Distortion is caused by the propagation of a duplex wave outside of the profile plane such that the true time of the wave's arrival at profile points is less than that calculated in relation to the same points when that wave is propagating within the profile plane. Consequently, the boundary in migrated cross-section shifts towards the source by an amount that depends on the angle between the projection of a sub-vertical event in the observation plane and the profile line.

Figure 5:
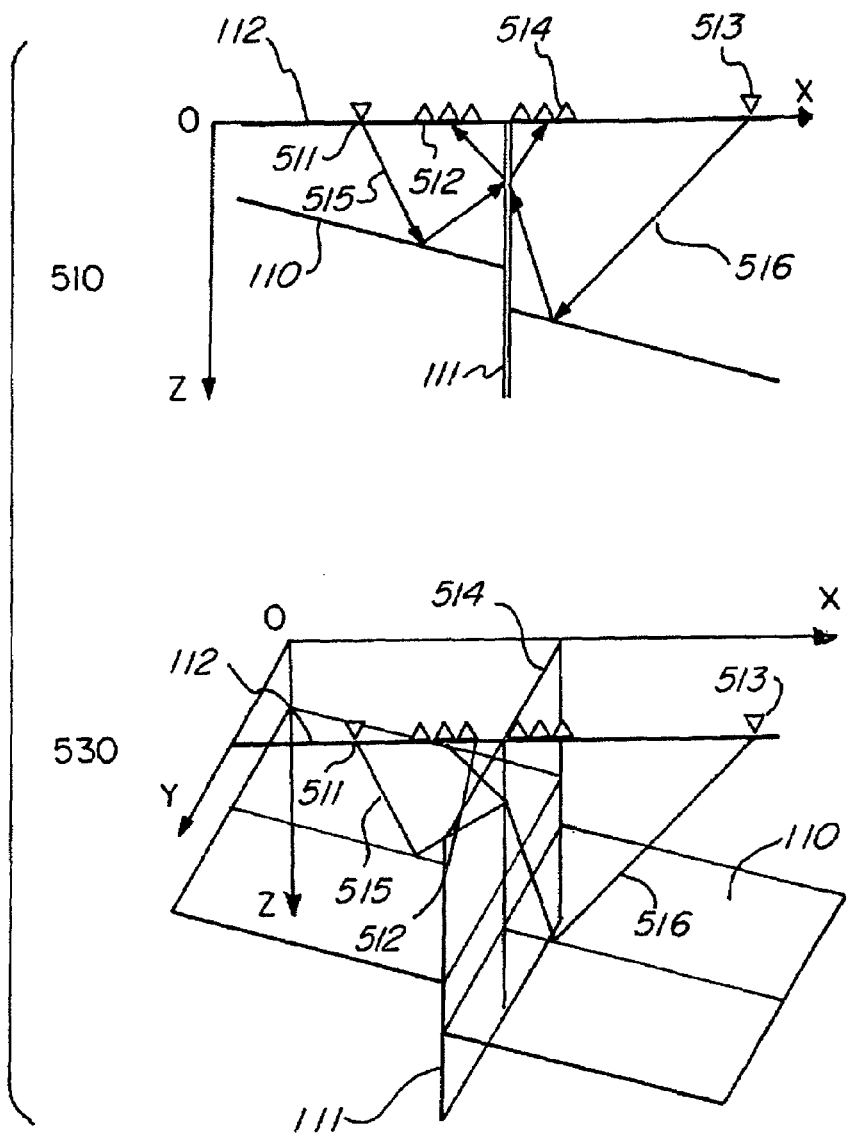
FIG. 5 is a ray path drawing (in side view and isometric or axonometric view) showing a target sub-vertical event orthogonal to its observation profile with sources on both sides of the target.

Referring to FIG. 5, there is illustrated (in 2 views) an example of the ray path drawing, when the target sub-vertical event is orthogonal to the observation profile using sources on both sides of target sub-vertical event ("SVE") 111, of a point on a duplex wave-front forming inside (2D side view 510) the observation profile plane, and then outside (3D isometric or axonometric view 530) that plane. Shown are: base boundary 110, SVE 111, a profile line on observation surface 112, left source 511 (left of target SVE 111), right source 513 (right of target SVE), left receivers 512 and right receivers 514 (positioned respectively to the left and right of target SVE 111), and duplex wave trajectories 515 and 516 (propagating respectively to the left and right off target SVE 111). As shown, the duplex waves resulting from triggering left source 511 and right source 513 are both of Type II. Assuming an exact velocity model used to create an orthogonal 2D image based on trajectories 515 and 516, then SVE 111 will appear in its true position in a duplex wave migrated cross-section—and the calculated positions of other sub-vertical events obtained from a common source gather to the left and right of SVE 111 will coincide. Assuming orthogonality of SVE 111 to the profile line, even when receivers are only positioned to the left or the right, the SVE 111 will still be 2D imaged in its correct position using either trajectory 515 or 516. However, when the profile line is not orthogonal to SVE 111, the imaged position of SVE 111 in the migrated 2D cross-section may not coincide with its true position. The shift may appear to either side of the true position, depending on the position of the related source. To obtain an undistorted migrated cross-section, corrections are introduced, which corrections are calculated based on 3D duplex wave modeling for a fixed base boundary and 2D duplex wave migration. As indicated using FIG. 11 to calculate such corrections the result of 2D migration is compared with a position of the sub-vertical event inside the observation profile plane.

Figure 3:
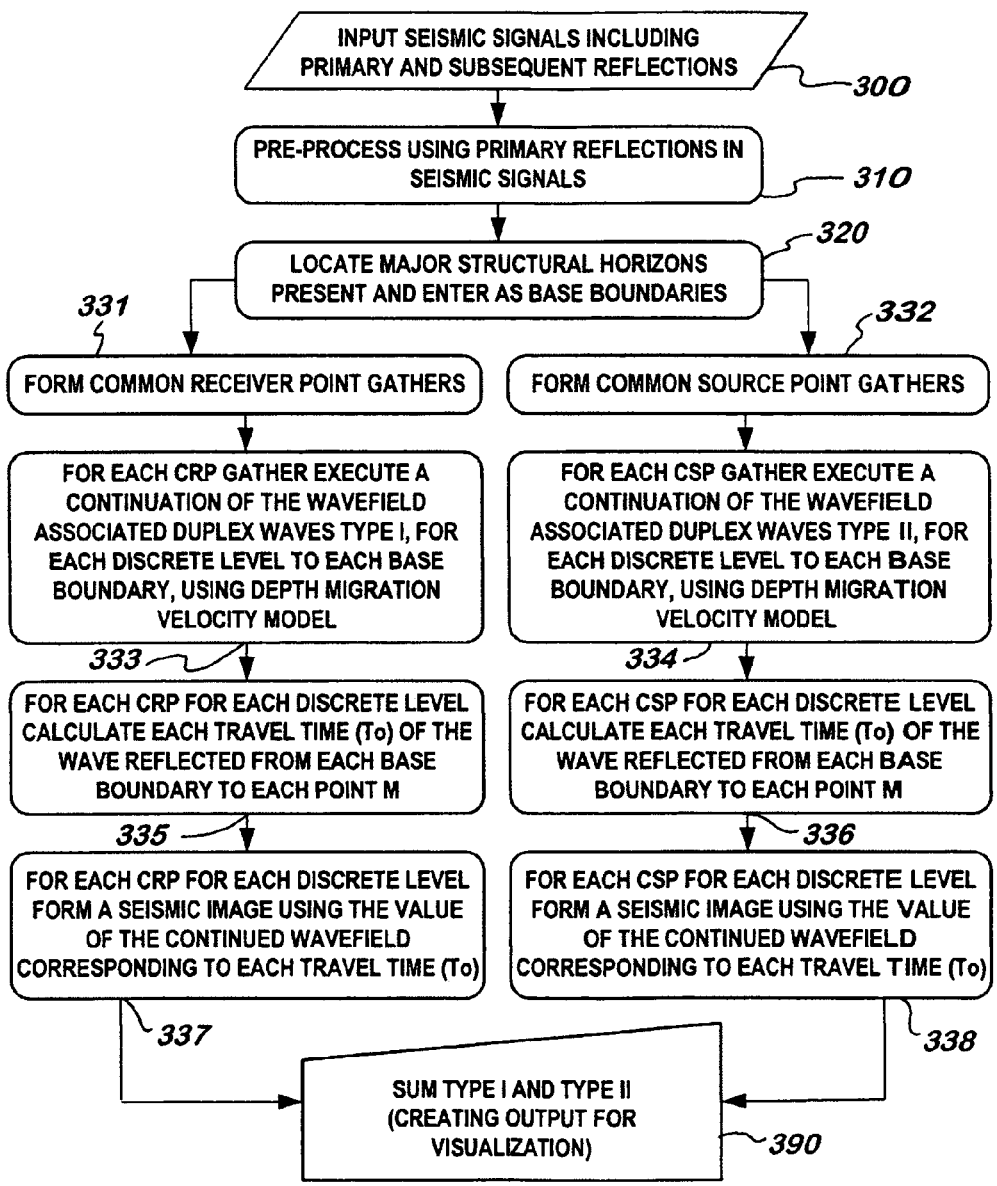
FIG. 3 is a flow chart of one embodiment of the method of the present invention.
Figure 6:
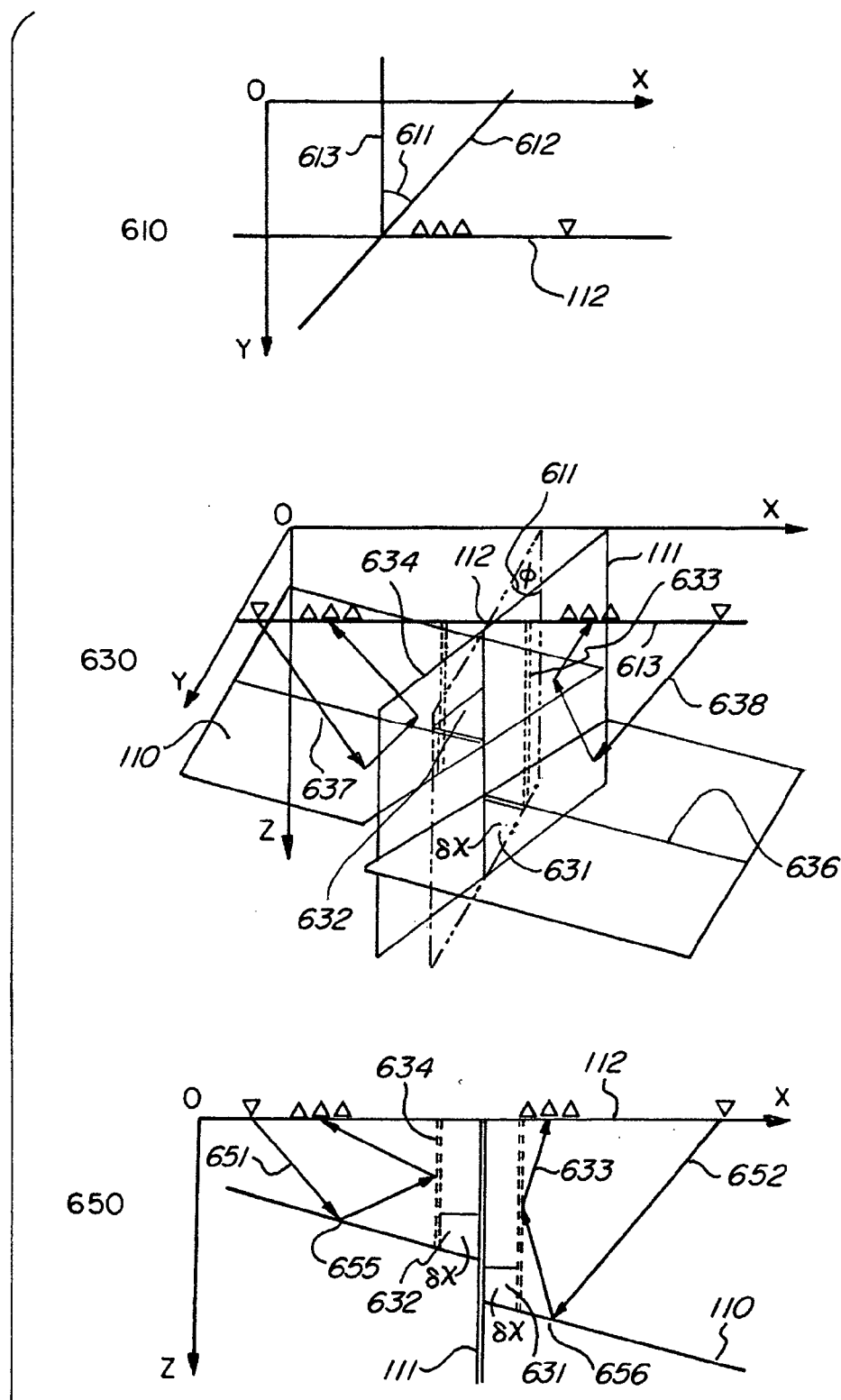
FIG. 6 is a ray path drawing (in 3 views) showing a target sub-vertical event not orthogonal to its observation profile with sources on both sides of the target.

Referring to FIG. 6, there is illustrated (to explain the migration principle presented at steps 335 and 337 of FIG. 3) a ray path drawing using 3 views relating to a duplex wave for 2D seismic when a sub-vertical event SVE 111 is not orthogonal to the profile cross-section. View 610 illustrates (in XY plane) a profile cross-section, where 611 is the non-orthogonality correction angle ("NOCA") measured between projection 612 of SVE 111 and line 613 perpendicular to a profile line (see below profile cross-section 650) on observation surface 112. View 630 illustrates a seismic cube including: line 636 (that is a projection of cross-section 650 onto base boundary 110) and trajectories 637 and 638 along each of which a duplex wave propagates away from SVE 111. A planar shadow of SVE 111 appears at location 634 from which a duplex wave propagating along trajectory 637 appears to originate. Similarly, a planar shadow of SVE 111 appears at location 633 from which a duplex wave propagating along trajectory 638 appears to originate. Consequently, when SVE 111 is not orthogonal to its profile line, a correction is required to avoid an imaging error caused by shift 632 and shift 631 making SVE 111 appear to be displaced from its true location. View 650 illustrates (in XZ plane) a profile cross-section that is a side-view of the XZ plane of view 630. Trajectories 651 and 652 (corresponding to trajectories 637 and 638) are calculated using 2D duplex wave migration when profile cross-section 650 (or the profile line on surface 112 in view 610) is not orthogonal to projection 612 of SVE 111 on observation surface 112. Assuming that base boundary 110 is orthogonal to profile cross-section 650, non-orthogonality for SVE 111 produces reflections from base boundary 110 at points 655 and 656 offset from line 636. To correct for the true position of SVE 111 (here 632 to the left and 631 to the right) the extent of the non-orthogonality between (line 613 perpendicular to a line on profile cross-section 650 and SVE 111 is taken into account. To obtain an undistorted migrated cross-section corrections are calculated based on 3D duplex wave modeling for base boundary 110 and SVE 111—for a plurality of different values of NOCA using 2D duplex wave migration.

The correction value is the magnitude of the shift when the migrated position is compared with model position of SVE 111 inside profile cross-section 650. An example of the above correction is shown in FIG. 11 (former FIG. 8). In this case 2D duplex wave migration is performed by: 1) Forming the common source gather ("CSG"); 2) Executing the inverse downward continuation of CSG wave-field on fixed discrete levels $Z_1, \ldots Z_i \ldots Z_n$ to base boundary 110; and 3) Form a seismic image of SVE 111 at each discrete depth level, for which the wave-field of the corresponding CSG is recalculated [where the values of seismic field F(X, Y, Z, T) are selected corresponding to the time delay equal to the wave travel time from: origin source O, then reflected from base boundary 110, and arrive at a corresponding point on the corresponding discrete level of the recalculated wave-field].

Figure 7:
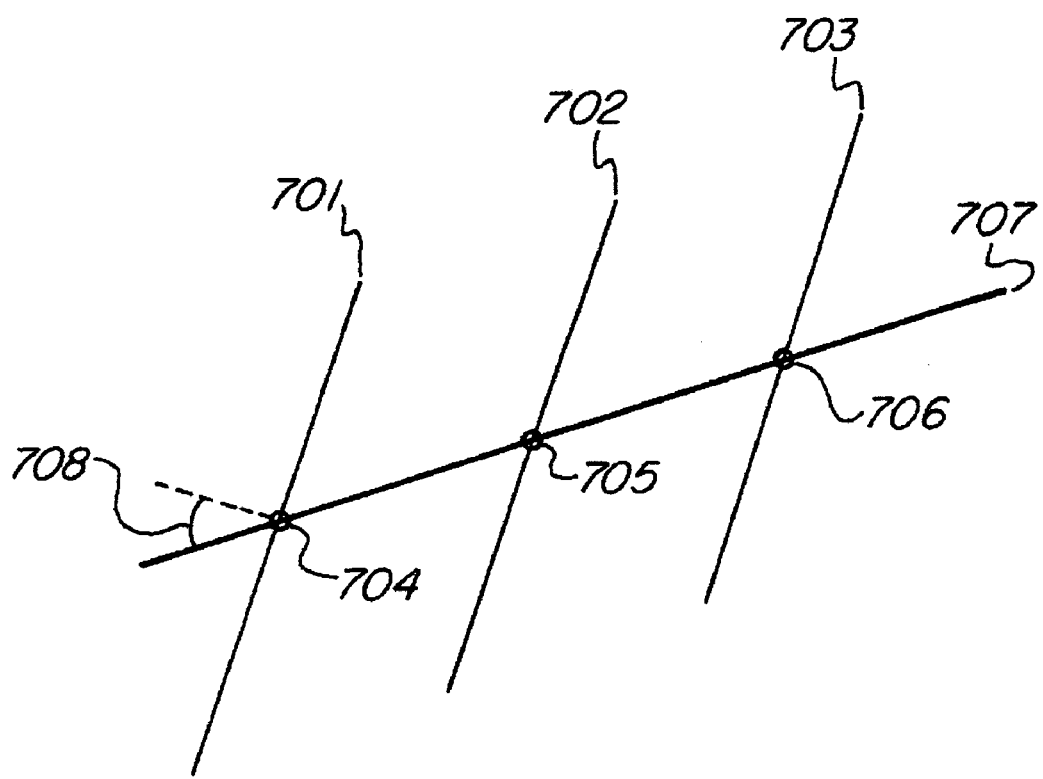
FIG. 7 is a side view useful for calculating the non-orthogonality correction angle "NOCA".

Referring to FIG. 7 there is illustrated a 2D based system for calculating (the non-orthogonality correction angle) NOCA 708 using a plurality of SVE target points 704, 705 and 706 on the level of a target seismic horizon intersecting observation profiles 701, 702, 703 respectively along dipping line 707. Duplex wave migration (2D) is done with each profile (701, 702 and 703) relating to the same fault (704, 705 and 706) and then interpolated. NOCA 708 can differ for different observation profiles of the system. Advantageously, for 2D observation geometry, receivers positioned on both sides off the source permit the separate determination of NOCA for each observation profile.

Figure 8:
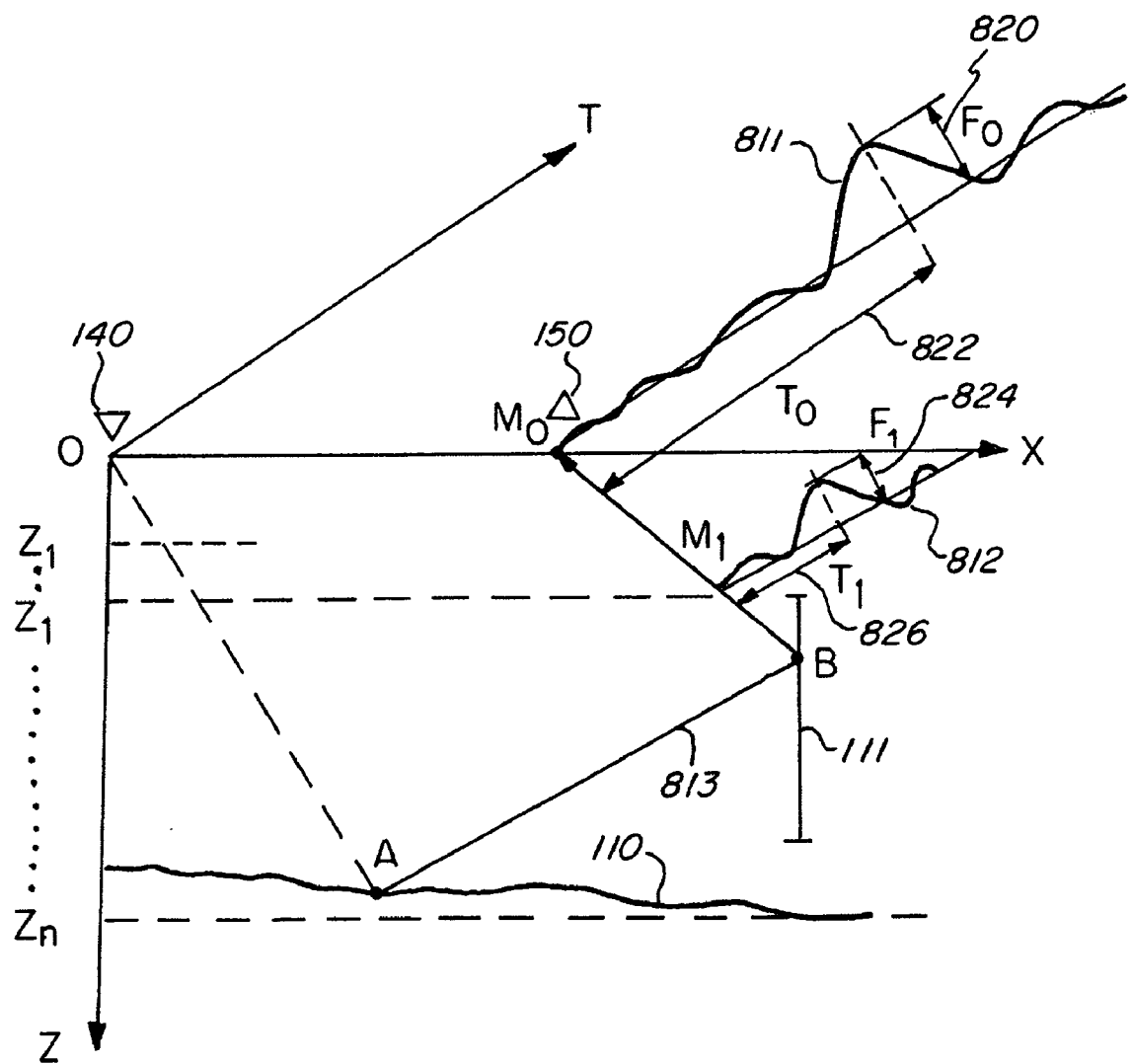
FIG. 8 is a perspective view of an observation geometry showing a trajectory for a duplex wave and the discrete levels Zi to which calculations are continued in support of migration.

Referring to FIG. 8 (previously FIGS. 6 and 7 in U.S. provisional Ser. No. 60/495,879) there are illustrated elements of the inventive method of duplex wave migration as set out in steps 332, 334, 336 and 338 of FIG. 3. Shown are: base boundary 110, target sub-vertical event 111, source 140, receiver 150, seismic signal 811 (registered in observation profile point $M_0$), seismic signal 812 (obtained in trace Mi, as result of the CSG wave-field continuation on level Zi), duplex wave trajectory 813 ($OABM_0$), $T_0$ seismic signal arrival time 822, $T_i$ duplex wave arrival time 826, surface amplitude $F_0$ 820, and subsurface amplitude $F_i$ 824.

For a wave-front (not shown) initiated at the origin by source 140 and propagating along ray path 813 reflection occurs at base boundary 110 and then SVE 111 to arrive at point $M_0$ where receiver 150 (part of any suitable 3D or 2D observation system) records surface amplitude $F_0$ 820 at $T_0$ seismic signal arrival time 822, and where $X_0, Y_0$ are the observation surface point coordinates. For the procedure of wave-field continuation, the relation $T_0 > T_1 > T_i$, $Z_0 < Z_1 < Zi < Zn$ is observed, where Zn is the last continuation level down to base boundary 110. Using a common source point gather (step 332) an inverse downward continuation of the CSPG wave-field is performed (step 334) starting from $X_0, Y_0$, at discrete levels $Z_1, \ldots Z_i \ldots$ (for observation surface point coordinates $X_i, Y_i$ at each level Zi) down to Zn at base boundary 110. At the surface 112 amplitude $F_0(X_0, Y_0, Z_0=0, T_0)$ is used for each CSPG with a velocity model to determine each $F_i(X_i, Y_i, Zi, T_i)$, and time of arrival at Mi, being $T_i$ duplex wave arrival time 826 (step 336). For each CSPG at each discrete level Zi a seismic image is formed using $F_i(X_i, Y_i, Zi, T_i)$ thereby constructing a seismic image of SVE 111 at each discrete depth level Zi, for which the wave-field of the corresponding CSG is recalculated.

Figure 9:
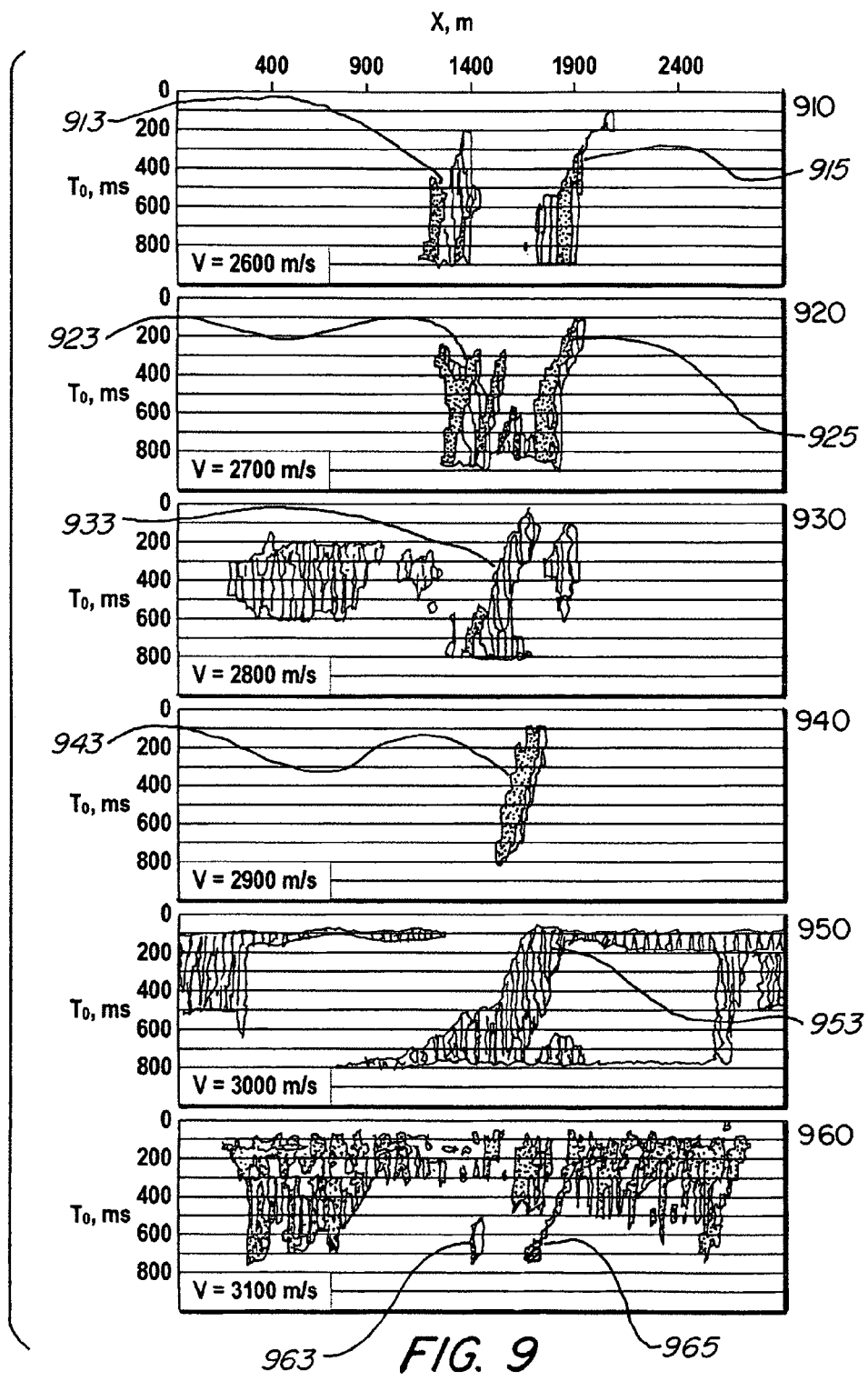
FIG. 9 is a migration velocity scan (in 6 screen shots) showing the effects of errors in velocity.

Referring to FIG. 9 there is illustrated (using 6 screen shots) a migration velocity scan, based on the migration of duplex waves using geometries similar to those in FIG. 5. This series of screen shots demonstrates how image quality improves as the velocity model is adjusted to increase accuracy.

Screen shot 910 depicts a fragment of a migrated stack, using constant migration velocity V=2600 m/s (lower than the true medium velocity), where: CSG 913 shows a sub-vertical event ("SVE") located to the left of the target boundary, and CSG 915 shows a SVE located to the right of the target boundary.

Screen shot 920 depicts a fragment of a migrated stack, using constant migration velocity V=2700 m/s (lower than the true medium velocity), where: CSG 923 shows a SVE located to the left of the target boundary, and CSG 925 shows a SVE located to the right of the target boundary.

Screen shot 930 depicts a fragment of a migrated stack, using constant migration velocity V=2800 m/s (lower than the true medium velocity), where: CSG 933 (results from destructive interference of seismic images by the target boundary) was created using a source located on each of the left and right of the SVE.

Screen shot 940 depicts a fragment of a migrated stack, using constant migration velocity V=2900 m/s (equal to the true medium velocity), where: CSG 943 (results from constructive interference of seismic images by the target boundary) shows a SVE located to the left and right of the target boundary.

Screen shot 950 depicts a fragment of a migrated stack, using constant migration velocity V=3000 m/s (higher than the true medium velocity), where: CSG 953 (results from destructive interference of seismic images by the target boundary) was created using a source located on each of the left and right of the SVE.

Screen shot 960 depicts a fragment of a migrated stack, using constant migration velocity V=3100 m/s (higher than the true medium velocity), where: CSG 963 shows a SVE located to the left of the target boundary, and CSG 965 shows a SVE located to the right of the target boundary.

Advantageously, according to the method of the present invention for using duplex waves to locate steeply dipping sub-vertical events (individual reflectors or vertical boundary layers), particularly when the dip angle exceeds 60 degrees, signals generated by sources on both sides of the target boundary may be correlated to correct the velocity model used. When non zero-offset source-receiver distances are applied, the assumption of migration velocities that are lower than the true medium velocities, causes a shift of the SVE image boundaries toward the sources by which the reflected signals were generated—while the assumption of migration velocities higher than the true medium velocities will shift those image boundaries away from the relevant sources. And, the greater the assumed velocity of the model differs from the true medium velocity, the greater those shifts will be. Therefore, with sources located on both sides of the target boundary, the use of inaccurate migration velocity assumptions causes the bifurcation of SVE images (see Screen shots 910, 920, and 960) because images are formed by independent sources on both the left and right sides of the target boundary.

However, when the migration velocities assumed in the model used are close to the true medium velocity, the signals used to create images destructively interfere (see Screen shots 930 and 950) with each other, which dramatically decreases signal amplitude on the migrated stack and effectively "erases" the images rather than bifurcating them.

Advantageously, when using duplex waves to locate steeply dipping sub-vertical events, and the migration velocities assumed in the model match the true medium velocity, the signals used to create images constructively interfere (see Screen shot 940) with each other, which increases signal amplitude on the migrated stack and strengthens the image rather than erasing it. Moreover, the image of the SVE is to a high degree of certainty presented in its true subsurface position. This characteristic of using duplex waves to locate steeply dipping sub-vertical events permits users to unambiguously determine the true migration velocity of a medium—independent of the curvature and inclination of the target SVE and all reference boundaries. Advantageously, velocity model corrections obtained in this way are useful for conventional seismic processing as well as the duplex wave migration processing of the present invention. And, in a circular and iterative manner, the above velocity model corrections increase the accuracy of conventional processing to locate the base boundaries used as input to duplex wave migration thereby further increasing the reliability of the imaging of steeply dipping sub-vertical events.

Figure 10:
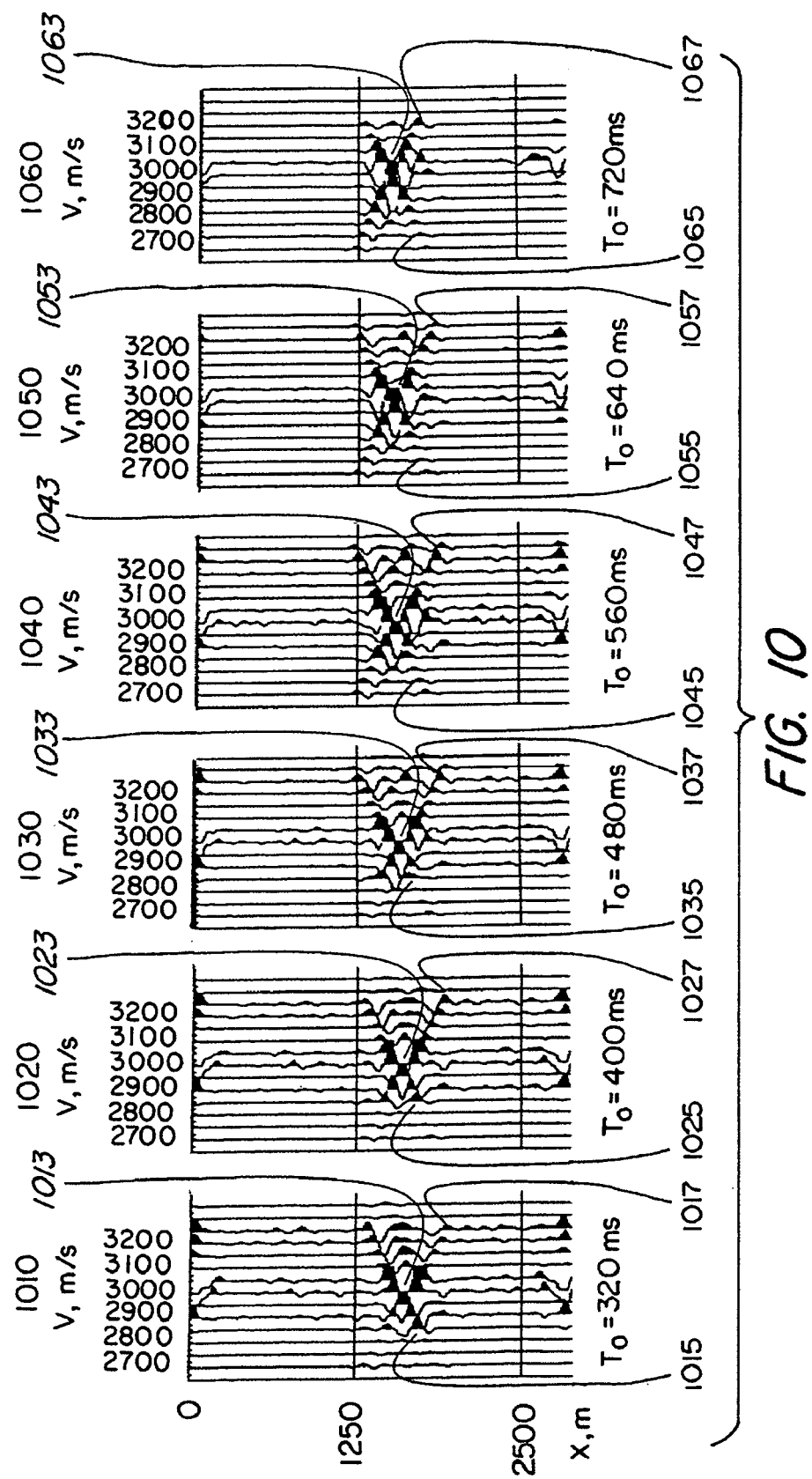
FIG. 10 is a series (in 6 screen shots) of horizontal slices of a model cube to illustrate a new form of velocity scanning visualization for duplex wave migration.

Referring to FIG. 10 there are illustrated (using 6 screen shots each depicting a horizontal section of function F=f(X, V, T)) a series of horizontal slices of a cube modeled (for function F=f(X, V, T=const)) using: a symmetrical observation geometry having a source on both sides of a target SVE, split spread shooting, and duplex wave migration velocity scanning. Positions 1013, 1023, 1033, 1043, 1053, and 1063 were all calculated based on a the correct medium migration velocity V=2900 m/s for this model. In the screen shots where indicated the Geometric Place of the Points ("GPP") 1015, 1025, 1035, 1045, 1055, and 1065 each correspond to images of a sub-vertical event at the time T indicated for the screen shot with which they are associated—and were obtained using different migration velocity values with a source on the right side of the SVE. Whereas, the GPP 1017, 1027, 1037, 1047, 1057, and 1067 each correspond to images of a sub-vertical event at the time T indicated for the screen shot with which they are associated—and use different migration velocity values, with a source on the left side of the SVE. Screen shot 1010 was taken at time T=320 ms; Screen shot 1020 was taken at time T=400 ms; Screen shot 1030 was taken at time T=480 ms; Screen shot 1040 was taken at time T=560 ms; Screen shot 1050 was taken at time T=640 ms; and Screen shot 1060 was taken at time T=720 ms. The visualization method of FIG. 10 allows a user to determine unambiguously the true position of the interface in question (e.g. location of a SVE) and the migration velocity at the point of intersection between GPP formed in the horizontal section of the seismic image functions F=f(X,V,T=const) where: X is distance along the profile, and T is the vertical time coordinate of seismic images obtained with different migration velocities V.

Using a source on the right side of the SVE while the assumed migration velocities are lower than the true medium velocities (here V=2900 m/s), leads to the formation of seismic images (1015 . . . 1065) with X coordinates that are less than those of the true position (1013 . . . 1063) of the interface. And, while the assumed migration velocities are higher than the true medium velocities, seismic images are formed with X coordinates greater than those of the true position (1013 . . . 1063) of the interface. Thus, seismic images, obtained within an assumed migration velocity range of V=2700 ms to 3200 m/s, for a source on the right side of the SVE and T=const, will form GPP (1015 . . . 1065), such that one of these points (1013 . . . 1063) corresponds to the true velocity and position of the target boundary. Similarly using a source on the left side of the SVE, and T=const, seismic images will form GPP (1017 . . . 1067), such that one of these points (1013 . . . 1063) corresponds to the true velocity and position of the target boundary. Therefore, the true velocity and position of the target SVE is located at the intersection of the GPP of the seismic images (1015 . . . 1065) and (1017 . . . 1067).

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Although the disclosure describes and illustrates various embodiments of the invention, it is to be understood that the invention is not limited to these particular embodiments. Many variations and modifications will now occur to those skilled in the art of seismic data interpretation. For a full definition of the scope of the invention, reference is to be made to the appended claims.

What is claimed is:

1. A method for processing seismic data recorded with at least one source and receiver, using at least one structural horizon at a known depth Zn, a velocity model, and a plurality of non-primary reflections including Type I and Type II duplex waves, for the purpose of imaging steeply dipping vertical events, the method comprising the steps:
   i) forming a plurality of common receiver point gathers ("CRPG") using said seismic data to create a CRPG wave-field;
   ii) continuing said CRPG wave-field using Type I duplex waves, for each said CRPG and for each discrete level $Z_i$ where i=0 to n, down to each said structural horizon Zn using said velocity model to determine a Type I amplitude.
   iii) calculating each Type I duplex wave travel time $T_i$ where i=0 to n, for each discrete level $Z_i$; and
   iv) forming a seismic image using said Type I amplitude corresponding to each said travel time $T_i$ for Type I duplex waves;
   v) forming a plurality of common source point gathers ("CSPG") using said seismic data so as to create a CSPG wave-field;
   vi) continuing said CSPG wave-field using Type II duplex waves, for each said CSPG and for each discrete level $Z_i$ down to each said structural horizon, using said velocity model to determine a Type II amplitude;
   vii) calculating each Type II duplex wave travel time $T_i$ for each discrete level $Z_i$; and
   viii) forming a seismic image using said Type II amplitude corresponding to each said travel time $T_i$ for Type II duplex waves;
   ix) summing said seismic image using Type I duplex waves with said seismic image using Type II duplex waves, to form a seismic image of a target event.

2. The method as claimed in claim 1 further comprising the steps: comparing at least two said seismic images resulting from a CSPG wave-field resulting from a source on each side of said steeply dipping vertical events; and adjusting said velocity model until all said seismic images appear as a single seismic image.

3. The method as claimed in claim 1 further comprising the step: attenuating wave-fields of amplitude greater than a threshold value and amplifying wave-fields of amplitude less than a threshold value.

4. A method for processing seismic data to determine sub-vertical events comprising the steps of:
  i) processing seismic data to obtain base boundary information;
  ii) processing seismic data from a first common receiver point gather to obtain a first approximation of a sub-vertical event location using an initial velocity model and Type I duplex waves;
  iii) processing seismic data from a first common source point gather to obtain a first approximation of a sub-vertical event location using an initial velocity model and Type II duplex waves;
  iv) repeating steps i) and ii) using other source and receiver point gathers to obtain corresponding first approximations of sub-vertical event locations using the initial velocity model;
  v) comparing all first approximations from steps i) to iii) to determine if the first approximations of sub-vertical event locations meet a threshold location accuracy;
  vi) iteratively adjusting the velocity model and repeating steps i) to v) until a threshold location accuracy is obtained.

5. A method as in claim 4 further comprising the step of stacking non-duplex waves out of phase to suppress non-duplex waves.

* * * * *